United States Patent
Usuda et al.

(10) Patent No.: US 10,089,022 B2
(45) Date of Patent: Oct. 2, 2018

(54) STORAGE CONTROLLING APPARATUS AND CONTROLLING METHOD

(71) Applicant: FUJITSU LIMITED, Kawasaki-shi, Kanagawa (JP)

(72) Inventors: Yosuke Usuda, Yokohama (JP); Akira Sampei, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 617 days.

(21) Appl. No.: 14/636,560

(22) Filed: Mar. 3, 2015

(65) Prior Publication Data
US 2015/0268882 A1 Sep. 24, 2015

(30) Foreign Application Priority Data

Mar. 24, 2014 (JP) .................. 2014-060903

(51) Int. Cl.
*G06F 3/06* (2006.01)

(52) U.S. Cl.
CPC .......... *G06F 3/0619* (2013.01); *G06F 3/0617* (2013.01); *G06F 3/0634* (2013.01); *G06F 3/0635* (2013.01); *G06F 3/0653* (2013.01); *G06F 3/0689* (2013.01); *G06F 2003/0692* (2013.01)

(58) Field of Classification Search
CPC .... G06F 3/0617; G06F 3/0619; G06F 3/0634; G06F 3/0635; G06F 3/0653; G06F 3/0689
See application file for complete search history.

(56) References Cited

U.S. PATENT DOCUMENTS

| | | | |
|---|---|---|---|
| 2005/0262400 A1 | 11/2005 | Nadeau et al. | |
| 2007/0174720 A1 | 7/2007 | Kubo et al. | |
| 2009/0217086 A1 | 8/2009 | Tanaka et al. | |
| 2009/0254702 A1* | 10/2009 | Kumano | G06F 1/3203 711/112 |

FOREIGN PATENT DOCUMENTS

| | | |
|---|---|---|
| JP | 2005-322399 | 11/2005 |
| JP | 2007-200301 | 8/2007 |
| JP | 2009-205316 | 9/2009 |

* cited by examiner

*Primary Examiner* — Aracelis Ruiz
(74) *Attorney, Agent, or Firm* — Fujitsu Patent Center

(57) ABSTRACT

A memory stores a statistical processing program for controlling a storage apparatus, first definition information to be updated together with the statistical processing program, and second definition information. When updating definition information together with updating the statistical processing program, a processor updates the first definition information. When updating definition information without updating the statistical processing program, the processor updates the second definition information. The processor performs statistical processing for controlling the storage apparatus by using the updated first definition information or the updated second definition information.

12 Claims, 14 Drawing Sheets

| MONITORING TARGET | STATISTIC |
|---|---|
| CM#0 | 0 |
| CM#1 | 0 |
| IOM#0 | 0 |
| IOM#1 | 0 |
| DISK#0 | 0 |
| DISK#1 | 0 |
| DISK#2 | 0 |

FIG. 2

| Status | | | Write | Read |
|---|---|---|---|---|
| SK | | ASC-ASCQ | ADDITIONAL VALUE | ADDITIONAL VALUE |
| No Sense | 0 | ALL | 15 | 15 |
| Recovered Error | 1 | 03-xx | 25 | 25 |
| | | 09-xx | | 25 |
| | | 13-xx | | |
| | | 14-xx | | |
| | | 15-xx | | |
| | | 16-xx | | |
| | | 17-xx | | |
| | | 18-xx | | |
| | | OTHERS | | |
| Not Ready | 2 | OTHERS | 128 | 128 |
| Medium Error | 3 | 03-xx | | 5 |
| | | 09-xx | 65 | 65 |
| | | 0C-xx | | 65 |
| | | 13-xx | 65 | 65 |
| | | 14-01 | 65 | |
| | | 14-xx | | |
| | | 15-xx | 65 | |
| | | 16-xx | 65 | |
| | | 31-xx | 65 | 65 |
| | | 32-xx | | |
| | | OTHERS | | |
| Copy Aborted | A | ALL | 85 | 85 |
| Aborted Command | B | 15-xx | 65 | 65 |
| | | OTHERS | 65 | 85 |
| Equal | C | ALL | 85 | 85 |
| Volume Overflow | D | ALL | 85 | 85 |

F I G. 6

| ERROR TYPE | DISK ADDITIONAL VALUE | ROUTE ADDITIONAL VALUE |
|---|---|---|
| Complete | 0 | 0 |
| Request Completed With Error | 20 | 15 |
| Abort | 33 | 25 |
| Invalid Request | 20 | 15 |
| Data Overrun | 20 | 15 |
| Data Underrun | 20 | 15 |
| Port Unavailable | 65 | 50 |
| Disk Port Unavailable | 65 | 50 |
| Busy | 20 | 15 |
| Timeout & Aborted | 33 | 25 |
| Driver Timeout | 33 | 25 |
| Port Fatal Error | 0 | 255 |
| Disk Fatal Error | 255 | 0 |

FIG. 7

STATISTICAL PROCESSING
PROGRAM 321
(ADDITIONAL VALUE
TABLE 811)

ADDITIONAL VALUE
TABLE 812

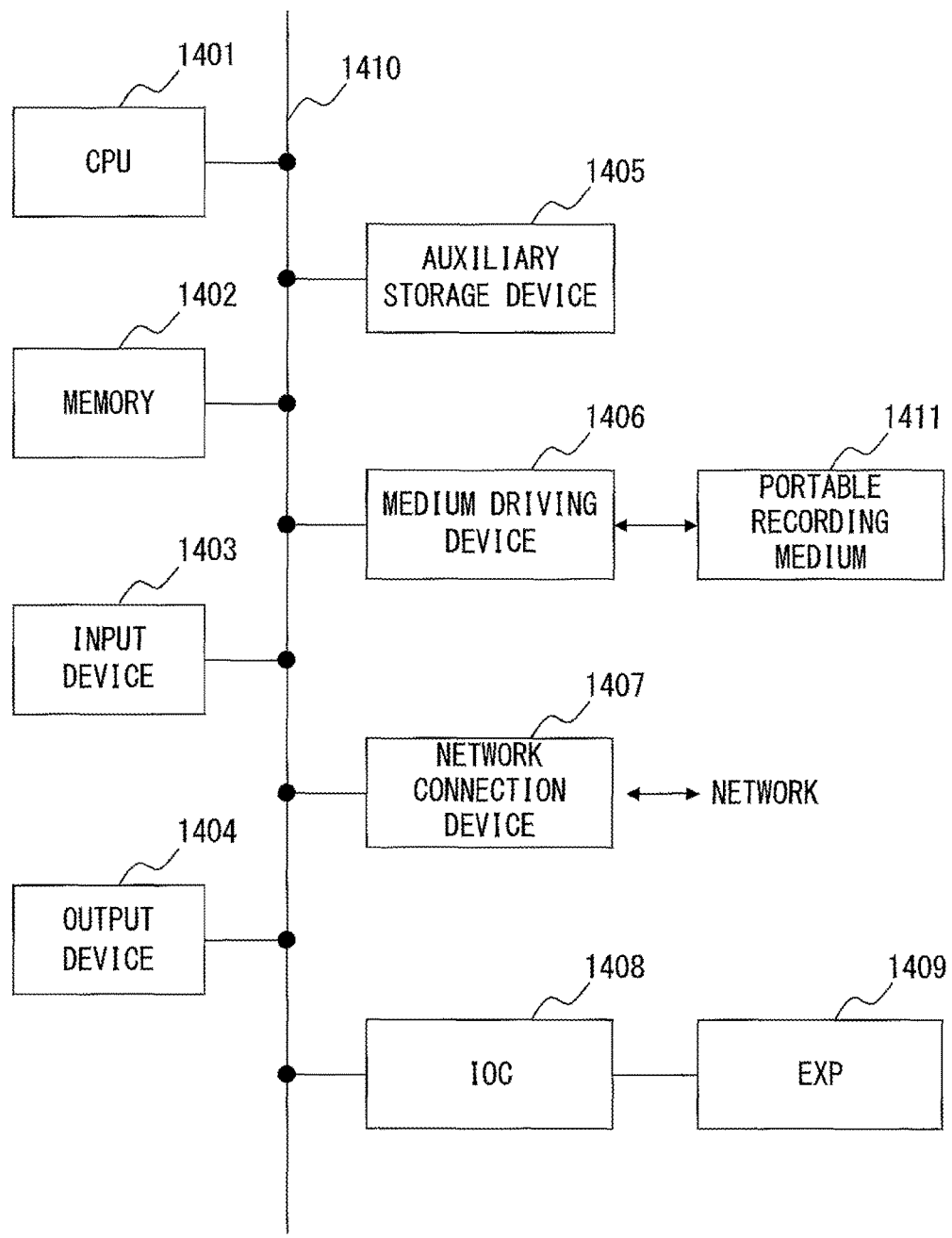
F I G. 14

STORAGE CONTROLLING APPARATUS AND CONTROLLING METHOD

CROSS-REFERENCE TO RELATED APPLICATION

This application is based upon and claims the benefit of priority of the prior Japanese Patent Application No. 2014-060903, filed on Mar. 24, 2014, the entire contents of which are incorporated herein by reference.

FIELD

The embodiments discussed herein are related to a storage controlling apparatus and a controlling method.

BACKGROUND

In a conventional disk array apparatus, abnormality monitoring based on statistical score addition processing has been performed for both disks and routes so as to degenerate abnormal disks and abnormal routes (see for example patent document 1).

FIG. 1 illustrates an exemplary configuration of a conventional disk array apparatus. A disk array apparatus 101 in FIG. 1 includes a controller module (CM) 111, a CM 112, and a disk enclosure (DE) 113. The DE 113 includes an input-output module (IOM) 121, an IOM 122, and disks 131-133.

The disks 131-133 are, for example, hard disk drives (HDDs). The CMs 111 and 112 and the IOMs 121 and 122 are route components included in routes from the CM 111 or 112 to the disks 131-133.

The CMs 111 and 112 are each connected to the IOMs 121 and 122. The IOMs 121 and 122 are each connected to the disks 131-133. The CMs 111 and 112 access the disks 131-133 via the IOM 121 or 122 and write or read data.

FIG. 2 illustrates an exemplary statistical information table held by the CM 111 of the disk array apparatus depicted in FIG. 1. The statistics in the statistical information table depicted in FIG. 2 indicate error occurrence statuses of individual monitoring-target components.

CM#0 and CM#1 are respectively identification information of CMs 111 and 112, and IOM#0 and IOM#1 are respectively identification information of IOMs 121 and 122. DISK#0 to DISK#2 are respectively identification information of disks 131 to 133.

When access to any of disks 131-133 fails, CM 111 adds an additional value that depends on an error factor to the statistic of a corresponding monitoring target. When the statistic becomes higher than a threshold during a monitoring period, CM 111 determines that a disk fault or route fault has occurred, and degenerates the corresponding monitoring target. This operation logically disconnects the monitoring-target component from the disk array apparatus, and this component becomes unused.

An apparatus is known that predicts a failure in a storage device (see for example patent document 2). That apparatus associates a technology descriptor with the storage device, sets a predictive failure threshold for the storage device, and detects a storage device error that exceeds the predictive failure threshold.

A method is also known for maintaining data integrity in storage devices (see for example patent document 3). That method detects impending data errors such as a track squeeze problem in a magnetic disk drive, and repairs the problem by rewriting the affected tracks.

Patent document 1: Japanese Laid-open Patent Publication No. 2009-205316
Patent document 2: Japanese Laid-open Patent Publication No. 2007-200301
Patent document 3: Japanese Laid-open Patent Publication No. 2005-322399

SUMMARY

According to an aspect of the embodiments, a storage controlling apparatus includes a memory and a processor.

The memory stores a statistical processing program for controlling a storage apparatus, first definition information to be updated together with the statistical processing program, and second definition information.

When updating definition information together with updating the statistical processing program, the processor updates the first definition information. When updating definition information without updating the statistical processing program, the processor updates the second definition information.

The processor performs statistical processing for controlling the storage apparatus by using the updated first definition information or the updated second definition information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates a statistical information table;
FIG. 6 illustrates an additional value table for disk errors;
FIG. 7 illustrates an additional value table for route errors;
FIG. 9 illustrates compatibility between a statistical processing program and an additional value table;
FIG. 14 is a hardware configuration diagram of an information processing apparatus.

DESCRIPTION OF EMBODIMENTS

The following will describe embodiments in detail with reference to the drawings.

For each error factor, a different additional value is added to the statistics in the statistical information table in FIG. 2, and a difference in, for example, vender of an HDD, configuration of a disk array apparatus, or environment for installing the disk array apparatus may lead to excessive or insufficient additions during an operation.

Performing excessive additions may cause a continuously usable normal disk to be mistakenly recognized as an abnormal component, and this disk may be disconnected. Insufficient additions may cause a delay in the disconnecting of an abnormal disk, thereby adversely affecting a host apparatus.

Accordingly, definition information such as additional values and thresholds is adjusted desirably in accordance with the status of an operation of a disk array apparatus. However, additional values and thresholds are set as fixed values in a firmware program intended for statistical processing, and hence updating the firmware program changes the additional values and the thresholds.

The updating of a firmware program carries modification of a source file, and hence making an update every time the status of an operation changes leads to a large workload. In particular, update of a firmware program for a disk array apparatus during a field operation causes a remarkably large workload. Thus, a method is desired wherein additional values and thresholds are changed without updating a firmware program.

Such a problem arises not only when an additional value or threshold changes, but also arises when another piece of definition information for use in statistical processing for controlling a disk array apparatus is changed. Such a problem is not limited to storage apparatuses that use an HDD as a memory apparatus, but also arises for a storage apparatus that uses another memory apparatus.

Figure 1:
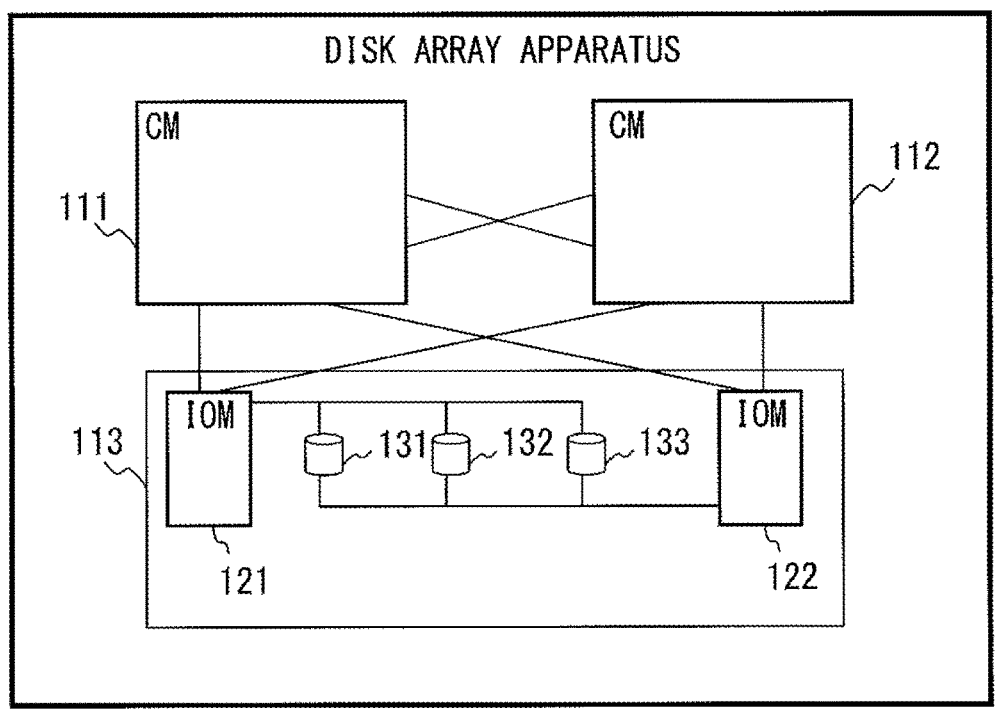
FIG. 1 is a configuration diagram of a disk array apparatus.
Figure 3:
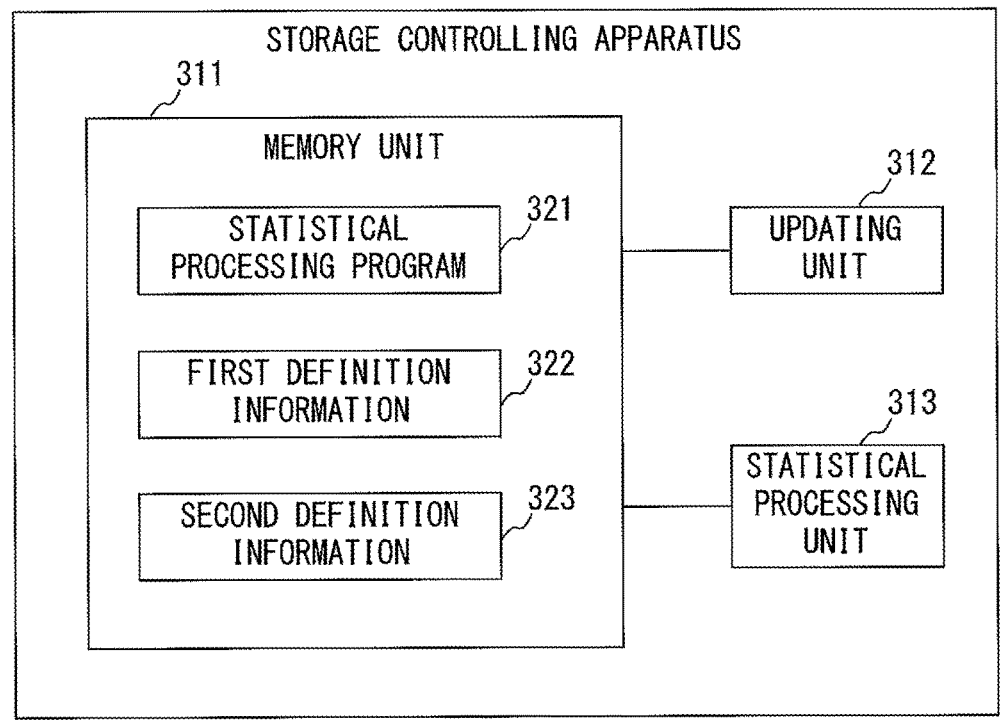
FIG. 3 is a functional configuration diagram of a storage controlling apparatus.

FIG. 3 illustrates an exemplary functional configuration of a storage controlling apparatus in accordance with an embodiment. A storage controlling apparatus 301 in FIG. 3 includes a memory unit 311, an updating unit 312, and a statistical processing unit 313.

The memory unit 311 stores a statistical processing program 321 for controlling a storage apparatus, first definition information 322 to be updated together with the statistical processing program 321, and second definition information 323. The updating unit 312 and the statistical processing unit 313 refer to the memory unit 311 and perform a process for controlling the storage apparatus according to information stored by the memory unit 311.

Figure 4:
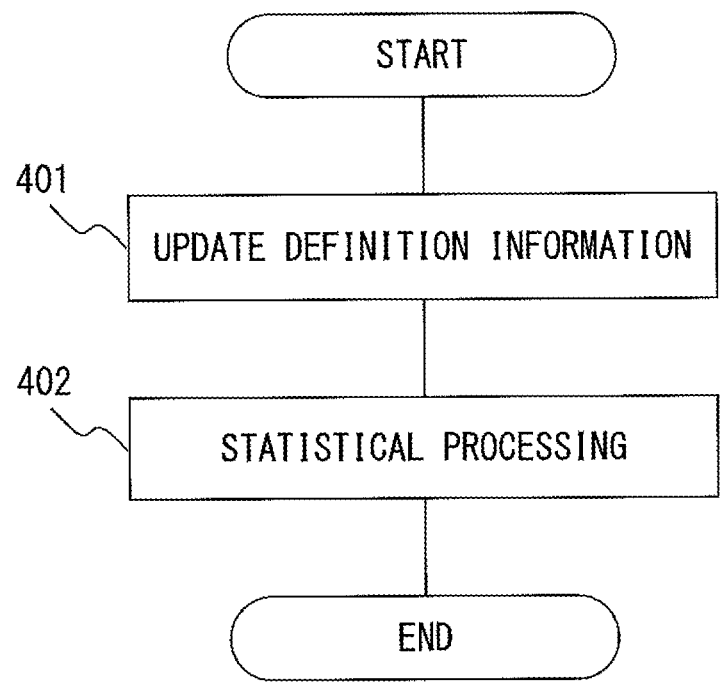
FIG. 4 is a flowchart of a control process.

FIG. 4 is a flowchart illustrating an exemplary control process performed by the storage controlling apparatus 301 depicted in FIG. 3.

When updating definition information together with updating the statistical processing program 321, the updating unit 312 updates first definition information 322; When updating definition information without updating the statistical processing program 321, the updating unit 312 updates second definition information 323 (step 401).

Using the updated first definition information 322 or the updated second definition information 323, the statistical processing unit 313 performs statistical processing for controlling the storage apparatus (step 402).

The storage controlling apparatus 301 in FIG. 3 allows definition information for use in statistical processing for controlling the storage apparatus to be more flexibly changed.

Figure 5:
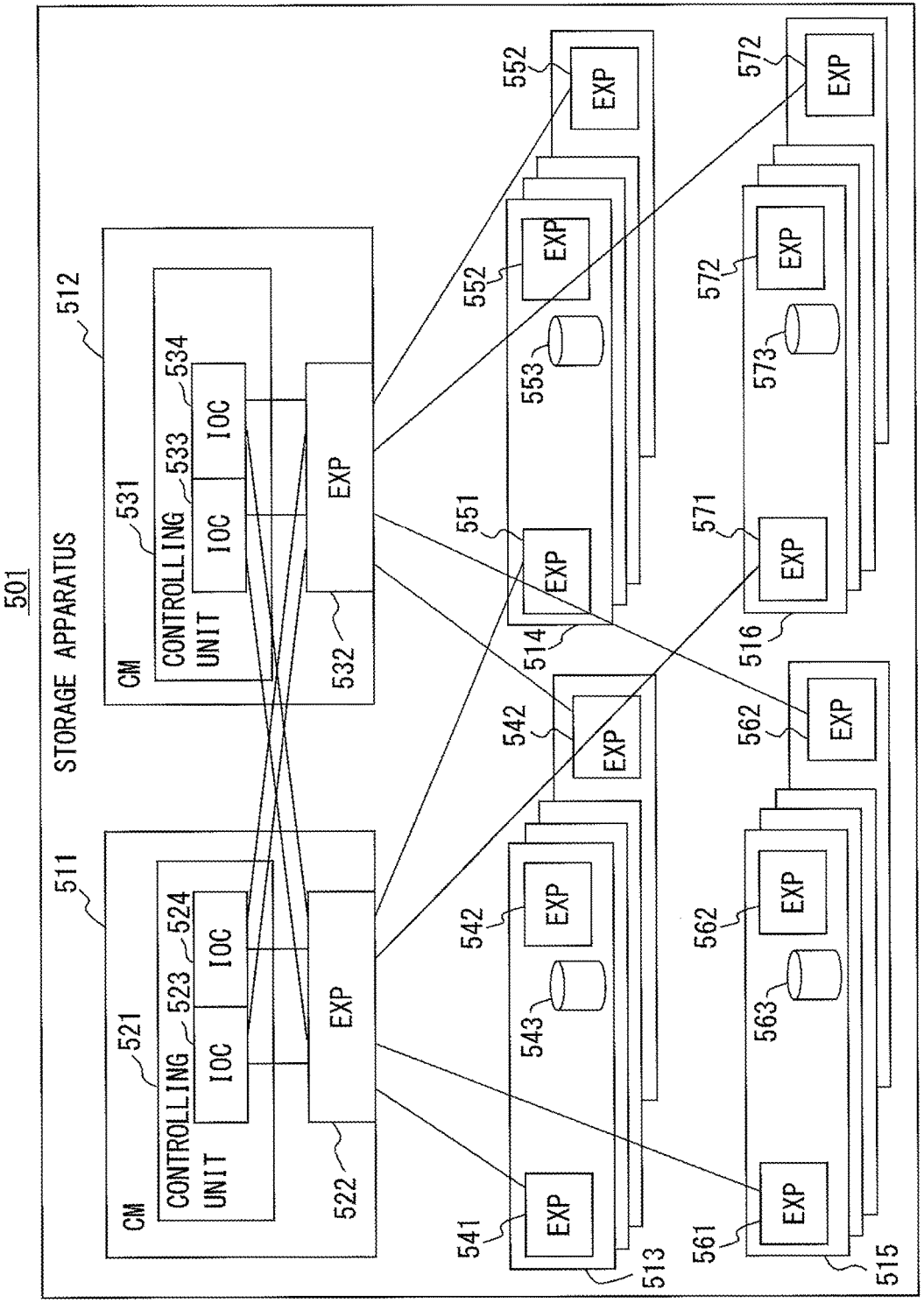
FIG. 5 is a configuration diagram of a storage apparatus.

FIG. 5 illustrates an exemplary configuration of a storage apparatus that includes the storage controlling apparatus 301 in FIG. 3. A storage apparatus 501 in FIG. 5 is, for example, a Redundant Arrays of Inexpensive Disks (RAID) apparatus, and includes CMs 511 and 512 and DE groups 513-516.

The CM 511 includes a controlling unit 521 and an expander (EXP) 522. The controlling unit 521 includes an input-output controller (IOC) 523 and an IOC 524. The CM 512 includes a controlling unit 531 and an EXP 532. The controlling unit 531 includes IOCs 533 and 534. The CMs 511 and 512 correspond to the storage controlling apparatus 301 in FIG. 3.

The DE group 513 includes a plurality of DEs. The DEs each include EXPs 541 and 542 and one or more disks 543. The disk 543 is connected to the EXPs 541 and 542. The plurality of EXPs 541 are connected in cascade to each other. The plurality of EXPs 542 are also connected in cascade to each other.

The DE group 514 includes a plurality of DEs. The DEs each include EXPs 551 and 552 and one or more disks 553. The disk 553 is connected to the EXPs 551 and 552. The plurality of EXPs 551 are connected in cascade to each other. The plurality of EXPs 552 are also connected in cascade to each other.

The DE group 515 includes a plurality of DEs. The DEs each include EXPs 561 and 562 and one or more disks 563. The disk 563 is connected to the EXPs 561 and 562. The plurality of EXPs 561 are connected in cascade to each other. The plurality of EXPs 562 are also connected in cascade to each other.

The DE group 516 includes a plurality of DEs. The DEs each include EXPs 571 and 572 and one or more disks 573. The disk 573 is connected to the EXPs 571 and 572. The plurality of EXPs 571 are connected in cascade to each other. The plurality of EXPs 572 are also connected in cascade to each other.

The EXPs 522, 532, 541, 542, 551, 552, 561, 562, 571, and 572 are, for example, interfaces such as Serial Attached SCSI (SAS) switches. The disks 543, 553, 563, and 573 are, for example, memory apparatuses such as HDDs.

The EXP 522 of the CM 511 is connected to the EXP 541 on a first stage from among the plurality of EXPs 541 of the DE group 513. Similarly, the EXP 522 is connected to the EXP 551 on a first stage of the DE group 514, the EXP 561 on a first stage of the DE group 515, and the EXP 571 on a first stage of the DE group 516.

The controlling unit 521 accesses the disk 543 of the DE group 513 via the IOCs 523 and 524 and the EXPs 522 and 541 and writes or reads data. Accordingly, the controlling unit 521, the IOCs 523 and 524, the EXPs 522 and 541 are route components included in a route from the controlling unit 521 to the disk 543. Portions closer to the controlling unit 521 correspond to upstream, and portions closer to the disk 543 correspond to downstream. This is also true for routes from the controlling unit 521 to the disks of the other DE groups.

The EXP 532 of the CM 512 is connected to the EXP 542 on a final stage from among the plurality of EXPs 542 of the DE group 513. Similarly, the EXP 532 is connected to the EXP 552 on a final stage of the DE group 514, the EXP 562 on a final stage of the DE group 515, and the EXP 572 on a final stage of the DE group 516.

The controlling unit 531 accesses the disk 543 of the DE group 513 via the IOCs 533 and 534 and the EXPs 532 and 542 and writes or reads data. Accordingly, the controlling unit 531, the IOCs 533 and 534, the EXPs 532 and 542 are route components included in a route from the controlling unit 531 to the disk 543. Portions closer to the controlling unit 531 correspond to upstream, and portions closer to the disk 543 correspond to downstream. This is also true for routes from the controlling unit 531 to the disks of the other DE groups.

The controlling units 521 and 531 perform statistical processing in accordance with the type of an error that occurs when the disk 543, 553, 563, or 573 is accessed. This allows a disk abnormality and a route abnormality to be monitored, and achieves Reliability Availability Serviceability (RAS) control.

The controlling units 521 and 531 may perform statistical processing using, for example, the following two types of statistical information tables.

(1) Disk Statistical Information Table

The disk statistical information table includes as many records as the total number of disks within the storage apparatus 501, and holds the statistical values of disk errors of the individual disks. The disk statistical information table is generated within a memory when the storage apparatus 501 is turned on; when the disk statistical information table is turned on, when a disk is disconnected, or when a prescribed time period elapses since a first addition, the statistical value of each disk is reset, i.e., set to 0.

(2) Route Statistical Information Table

The route statistical information table includes as many records as the total number of monitoring-target route components within the storage apparatus 501, and holds the statistical values of route errors of the individual route components. Monitoring-target route components include, for example, controlling units, IOCs, ports within the IOCs, EXPs within CMs, and EXPs within DEs.

The route statistical information table is generated within a memory when the storage apparatus 501 is turned on; when the route statistical information table is turned on or when a prescribed time period elapses since a first addition, the statistical value of each route component is reset, i.e., set to 0.

When a route component is disconnected, the statistical values of the separated route component and route components located downstream of the separated route component are reset, i.e., set to 0, and the statistical values of route components located upstream of the separated route component are changed into a lower value. Simultaneously, in the disk statistical information table, the statistical values of all of the disks on the route are also reset, i.e., set to 0.

FIG. 6 illustrates an exemplary additional value table for disk errors, the additional value table being held by the controlling units 521 and 531 depicted in FIG. 5. The first definition information 322 and the second definition information 323, both depicted in FIG. 3, may include the additional value table in FIG. 6.

In FIG. 6, "Status" indicates an error type of a disk error; "Write", an additional value added when an error occurs in a writing operation; "Read", an additional value added when an error occurs in a reading operation.

When an error indicated by "Status" occurs in access to a disk, the controlling units 521 and 531 add a corresponding additional value to the statistical value of the corresponding disk.

FIG. 7 illustrates an exemplary additional value table for route errors, the additional value table being held by the controlling units 521 and 531 depicted in FIG. 5. The first definition information 322 and the second definition information 323, both depicted in FIG. 3, may include the additional value table in FIG. 7.

In FIG. 7, "ERROR TYPE" indicates the error type of a route error; "DISK", an additional value added to a statistic in the disk statistical information table; "ROUTE", an additional value added to a statistic in the route statistical information table.

When an error indicated by the "ERROR TYPE" occurs in access to a disk, the controlling units 521 and 531 add an additional value indicated by "DISK" to the statistic of the corresponding disk. In addition, the controlling units 521 and 531 add an additional value indicated by "ROUTE" to the statistics of all of the route components present on a route to that disk.

The additional value table in FIG. 6 may be provided for each disk. The additional value table in FIG. 7 may be provided for each route component. The additional value tables in FIGS. 6 and 7 may include a threshold compared with a statistic in determining an abnormality.

Figure 8:
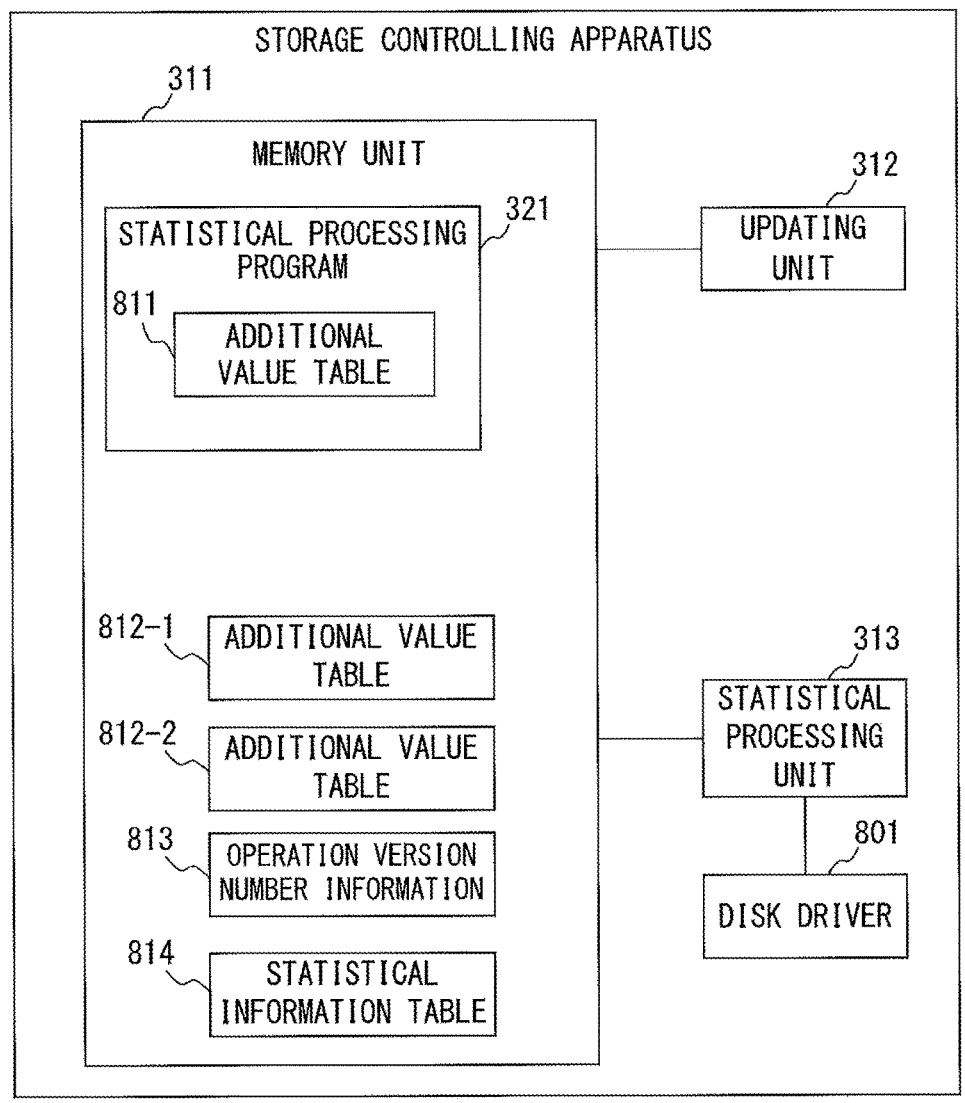
FIG. 8 illustrates a specific example of a storage controlling apparatus.

FIG. 8 illustrates a specific example of the storage controlling apparatus 301 in FIG. 3. The storage controlling apparatus 301 in FIG. 8 includes the memory unit 311, the updating unit 312, the statistical processing unit 313, and a disk driver 801. The controlling units 511 and 531 in FIG. 5 may include the memory unit 311, the updating unit 312, the statistical processing unit 313, and the disk driver 801.

The memory unit 311 stores, in a memory region, information on the statistical processing program 321, additional value tables 812-1 and 812-2, operation version number information 813, and a statistical information table 814. The statistical processing program 321 includes information on an additional value table 811.

The additional value table 811 corresponds to the first definition information 322 in FIG. 3 and may be updated together with update of the statistical processing program 321. The additional value tables 812-1 and 812-2 correspond to the second definition information 323 in FIG. 3, and may be updated without updating the statistical processing program 321. Only one of the additional value table 812-1 or 812-2 is made to be valid, and the other is made to be invalid. The additional value tables 812-1 and 812-2 may hereinafter be collectively referred to as an additional value table 812.

The additional value tables 811, 812-1, and 812-2 are provided for, for example, each monitoring-target disk or route component, and include information on additional values for each error type depicted in FIG. 6 or 7 and information on a threshold. In addition, the statistical processing program 321 and the additional value tables 811, 812-1, and 812-2 include version number information indicating version numbers.

Operation version number information 813 indicates the version number of a currently used additional value table from among the additional value table 811 and a valid additional value table 812. The statistical information table 814 includes at least one of the disk statistical information table or the route statistical information table.

By updating the statistical processing program 321, the updating unit 312 can update the statistical processing program 321 and the additional value table 811. By updating the additional value table 812, the updating unit 312 can update an additional value and a threshold without updating the statistical processing program 321. In the updating of the statistical processing program 321, the additional value table 811, or the additional value table 812, the updating unit 312 also updates the version number information.

The disk driver 801 controls access to the disk 543, 553, 563, or 573, and reports an error type to the statistical processing unit 313 when an error occurs during access.

The statistical processing unit 313 performs statistical processing using the statistical processing program 321, obtains an additional value corresponding to an error type from an additional value table corresponding to a version number indicated by operation version number information 813, and adds this additional value to a statistic in the statistical information table 814. When the statistic exceeds a threshold, the statistical processing unit 313 performs a process of logically disconnecting a corresponding monitoring-target disk or route component.

The following will describe management of version numbers of additional value tables performed by the storage controlling apparatus 301. As described above, the statistical processing unit 313 selects one of the additional value table 811 or a valid additional value table 812, and uses the selected table for statistical processing.

Version numbers indicated by version number information of the additional value tables 811 and 812 may be expressed as, for example, CxxUyy. Cxx corresponds to a compatibility version number; there is compatibility between additional value tables with the same value, and there is no compatibility between additional value tables with different values. xx expresses a two-digit integer number and is incremented by one when an additional value table with no compatibility is newly generated. Uyy corresponds to an update version number. yy expresses a two-digit integer number and is incremented by one when a new additional value table is generated.

FIG. 9 illustrates compatibility between the statistical processing program 321 and the additional value table 812. Version numbers indicated by version number information of the statistical processing program 321 may be expressed as, for example, VxxLzz-aaaa. CxxUyy, which is parenthesized and located to the right of VxxLzz-aaaa, indicates a version number of the additional value table 811 included in the statistical processing program 321.

Vxx corresponds to a compatibility version number, and "xx" in "Vxx" is the same value as "xx" in the "Cxx" in parenthesis. Lzz corresponds to an update version number. zz expresses a two-digit integer number and is incremented by one when a new statistical processing program 321 is generated.

In FIG. 9, solid lines indicate that there is compatibility between the statistical processing program 321 (additional value table 811) and the additional value table 812, and dashed dotted lines indicate that there is no compatibility therebetween.

The following are rules for selecting an additional value table for use in statistical processing from among the additional value tables 811 and 812.

Rule 1: The additional value table 811 is selected when the additional value tables 811 and 812 each have a different compatibility version number. Rule 2 is used when the additional value tables 811 and 812 have an equal compatibility version number.

Rule 2: An additional value table with a greater update version number from among the additional value tables 811 and 812 is selected.

The following procedures 1-5 indicate an example in which different additional value tables are selected in accordance with update of the statistical processing program 321 or the additional value table 812.

Procedure 1: At the time of shipping the storage controlling apparatus 301, the statistical processing program 321 (additional value table 811) is set to V10L20-0000 (C10U10), and the additional value table 812 is set to C00L00.

In this case, the compatibility version number C10 of the additional value table 811 is different from the compatibility version number C00 of the additional value table 812, and hence the additional value table 811 is selected.

Procedure 2: The statistical processing program 321 (additional value table 811) is updated from V10L20-0000 (C10U10) to V10L21-0000 (C10U10).

In this case, the version number C10U10 of the additional value table 811 does not change, and the compatibility version number C10 of the additional value table 811 is different from the compatibility version number C00 of the additional value table 812. Thus, the additional value table 811 is selected.

Procedure 3: The additional value table 812 is updated from C00L00 to C10U11.

In this case, the compatibility version number C10 of the additional value table 811 is equal to the compatibility version number C10 of the additional value table 812, and the update version number U11 of the additional value table 812 is greater than the update version number U10 of the additional value table 811. Thus, the additional value table 812 is selected.

Procedure 4: Without the storage controlling apparatus 301 being reactivated, the statistical processing program 321 (additional value table 811) is updated from V10L21-0000 (C10U10) to V10L22-0000 (C10U11).

In this case, the compatibility version number C10 of the additional value table 811 is equal to the compatibility version number C10 of the additional value table 812, and the update version number U11 of the additional value table 811 is equal to the update version number U11 of the additional value table 812. Thus, the additional value table 811 is selected.

Procedure 5: Without the storage controlling apparatus 301 being reactivated, the statistical processing program 321 (additional value table 811) is updated from V10L22-0000 (C10U10) to V10L23-0000 (C10U12).

In this case, the compatibility version number C10 of the additional value table 811 is equal to the compatibility version number C10 of the additional value table 812, and the update version number U12 of the additional value table 811 is greater than the update version number U11 of the additional value table 812. Thus, the additional value table 811 is selected.

In the meantime, update of the statistical processing program 321 (additional value table 811) may not only increase but also decrease a version number. Assume that, subsequently to procedure 5, the statistical processing program 321 (additional value table 811) is updated from V10L23-0000 (C10U12) to V10L20-0000 (C10U10).

In this case, the compatibility version number C10 of the additional value table 811 is equal to the compatibility version number C10 of the additional value table 812, and the update version number U11 of the additional value table 812 is greater than the update version number U10 of the additional value table 811. Thus, the additional value table 812 is selected. In addition, when the additional value table 812 is updated from C10U11 to C10U10, the additional value table 811 is selected.

Updating is prohibited when an attempt is mistakenly made to update the additional value table 812 to an incompatible version number. Assume that, subsequently to procedure 5, an attempt is made to update the additional value table 812 from C10U11 to C20U10.

In this case, the compatibility version number C10 of the additional value table 811 is different from the compatibility version number C20 of the additional value table 812, and hence update of the additional value table 812 is prohibited.

However, the statistical processing program 321 (additional value table 811) could be updated to an incompatible version number. Assume that, subsequently to procedure 5, the statistical processing program 321 (additional value table 811) is updated from V10L23-0000 (C10U12) to V20L10-0000 (C20U10) without the storage controlling apparatus 301 being reactivated.

In this case, the compatibility version number C20 of the additional value table 811 is different from the compatibility version number C10 of the additional value table 812, and hence the additional value table 811 is selected.

With reference to FIGS. 10-13, the following will describe a control process performed by the storage controlling apparatus 301 depicted in FIG. 8. In the following descriptions, a master CM and a slave CM respectively correspond to CMs 511 and 512 depicted in FIG. 5.

Figure 10:
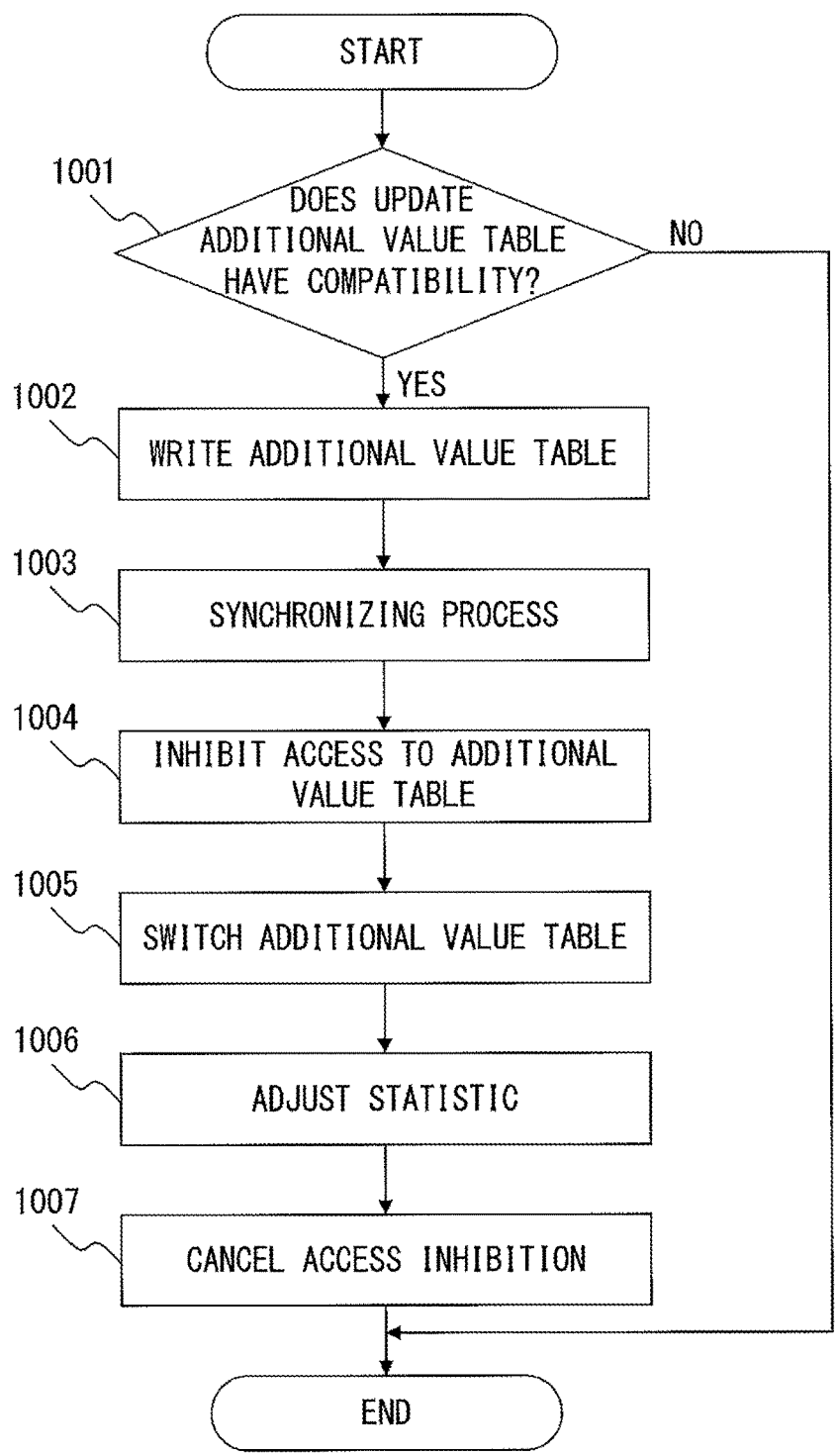
FIG. 10 is a flowchart of an updating process.

FIG. 10 is a flowchart of an exemplary updating process performed by updating units 312 of a master CM and slave CM when an operator gives, via a man-machine interface (MMI), an instruction to update the additional value table 812.

The updating unit 312 of the master CM checks compatibility of an update additional value table input via the MMI (step S1001). When the update additional value table has compatibility (YES in step S1001), the updating unit 312 of the master CM uses the update additional value table so as to overwrite an invalid additional value table 812 within the memory unit 311 (step S1002).

The updating unit 312 of the master CM transfers the overwritten additional value table 812 to the slave CM (step 1003). The updating unit 312 of the slave CM uses the received additional value table 812 so as to overwrite an invalid additional value table 812 within the memory unit 311. Consequently, the invalid additional value table 812 of the slave CM synchronizes with the invalid additional value table 812 of the master CM.

The updating units 312 of the master CM and slave CM perform exclusive control for switching between additional value tables 812, thereby temporarily inhibiting access to the additional value tables 812 (step 1004).

The updating units 312 of the master CM and slave CM change the overwritten additional value table 812 from an invalid state to a valid state, and change the other additional value table 812 from the valid state to the invalid state (step 1005). The updating units 312 of the master CM and slave CM change operation version number information 813 within the memory unit 311 into version number information of the valid additional value table 812. Consequently, the additional value table 812 to be used is switched.

The updating units 312 of the master CM and slave CM adjust a statistic in the statistical information table 814 within the memory unit 311 in conformity with a valid additional value table 812 (step 1006). The updating units 312 of the master CM and slave CM cancel inhibition of access to the additional value table 812 (step S1007).

When the update additional value table does not have compatibility (NO in step 1001), the updating unit 312 of the master CM ends the process without updating the additional value table 812.

Figure 11:
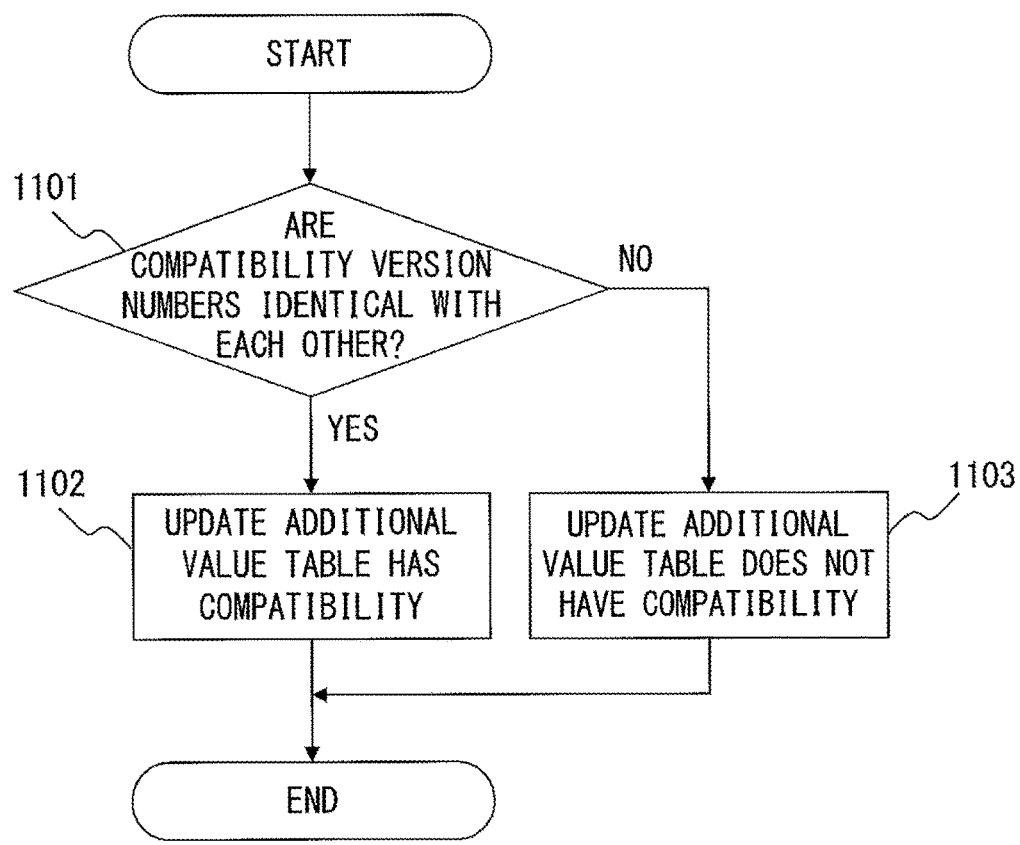
FIG. 11 is a flowchart of a compatibility check.

FIG. 11 is a flowchart depicting an exemplary compatibility check performed in step 1001 in FIG. 10. The updating unit 312 of the master CM reads operation version number information 813 from the memory unit 311 and compares a compatibility version number indicated by version number information of the update additional value table with a compatibility version number indicated by operation version number information 813 (step 1011).

When the compatibility version number indicated by version number information of the update additional value table is identical with the compatibility version number indicated by operation version number information 813 (YES in step 1101), the updating unit 312 of the master CM determines that the update additional value table has compatibility (step 1102). On the other hand, when the compatibility version number indicated by version number information of the update additional value table is different from the compatibility version number indicated by operation version number information 813 (NO in step 1101) the updating unit 312 of the master CM determines that the update additional value table does not have compatibility (step 1103).

Making the compatibility check of update additional value tables may prevent an incompatible update additional value table from being mistakenly applied.

The compatibility check may be made before the updating process starts. In this case, an operator terminal connected to the master CM transfers version number information of the update additional value table to the master CM and receives a check result of the compatibility check from the master CM. According to the check result displayed on the screen of the operator terminal, the operator may determine whether to apply the update additional value table.

The operator terminal may read version number information of an additional value table 812 from the master CM and display the information on the screen. According to the displayed version number information, the operator may check the version number of the additional value table 812 within the master CM.

In the updating process in FIG. 10, the additional value tables 812-1 and 812-2 are used in turn so that the additional value tables 812 can be updated without stopping operations of the master CM and the slave CM. In this case, a source file of the statistical processing program 321 does not need to be modified. Even after the power is turned off, the master CM and the slave CM can maintain the updated additional value table 812.

In step 1005 in FIG. 10, the updating units 312 of the master CM and slave CM may reset, i.e., set to 0, the processing time that has elapsed since a first addition. In this case, the statistical processing unit 313 starts to measure off the processing time again and resets, or sets to 0, a statistic when a prescribed time period elapses. When an instruction to update an additional value table 812 is given during a process of disconnecting a disk or route component, the updating units 312 of the master CM and slave CM wait for completion of the disconnecting process, and then perform the updating process.

The following will describe an example of the adjusting of a statistic in step 1006 in FIG. 10. When an additional value and a threshold are changed in accordance with update of an additional value table 812, an allowable number of errors, i.e., a ratio between the additional value and the threshold, may change after the update is made. Since the statistics already accumulated within the statistical information table 814 are values calculated according to an additional value before the update, continuing to use the statistics before the update could lead to an incorrect disconnecting process.

An exemplary situation will be discussed in which additional values and thresholds before and after update are as follows.

Threshold before update=255
Additional value before update=50
Statistic before update=150
Threshold after update=100
Additional value after update=10

In this case, the allowable numbers of errors before and after update are as follows.

$$\text{Allowable number of errors before update} = \text{threshold before update/additional value before update} = 255/50 \quad (1)$$

$$\text{Allowable number of errors after update} = \text{threshold after update/additional value after update} = 100/10 \quad (2)$$

Formula (1) allows an occurrence of six errors, and the statistic before update "150" indicates that three errors have occurred. Meanwhile, formula (2) allows an occurrence of eleven errors.

However, using a statistic before update directly as a statistic after update causes the statistic after update "150" to exceed the threshold "100" as soon as the threshold changes from "255" to "100" in accordance with update of the additional value table 812. Hence, a process of disconnecting a monitoring target is performed due to the update of the additional value table 812, and this is considered to be unfavorable in terms of operations.

In one possible example, it is desirable to adjust a statistic after update in a manner such that rates of error occurrence before and after update become identical with each other. The rates of error occurrence before and after update may be determined using the following formulae.

$$\text{Rate of error occurrence before update} = \text{number of errors before update/allowable number of errors before update} \quad (11)$$

$$\text{Number of errors before update} = \text{statistic before update/additional value before update} \quad (12)$$

$$\text{Allowable number of errors before update} = \text{threshold before update/additional value before update} \quad (13)$$

$$\text{Rate of error occurrence after update} = \text{Number of errors after update/allowable number of errors after update} \quad (21)$$

$$\text{Number of errors after update} = \text{statistic after update/additional value after update} \quad (22)$$

$$\text{Allowable number of errors after update} = \text{threshold after update/additional value after update} \quad (23)$$

The right side of formula (11) is equal to the right side of formula (21), thereby satisfying the following formula.

$$\text{Number of errors before update/allowable number of errors before update} = \text{Number of errors after update/allowable number of errors after update} \quad (31)$$

The following formula is obtained by replacing the numbers of errors before and after update in formula (31) and the allowable numbers of errors before and after update therein using formulae (12), (13), (22), and (23) and by arranging the formula for a statistic after update.

$$\text{Statistic after update} = (\text{threshold after update/threshold before update}) * \text{statistic before update} \quad (32)$$

Hence, a statistic after update may be determined using the following formula, where threshold before update=255, statistic before update=150, and threshold after update=100.

$$\text{Statistic after update} = (100/255)*150 = 58.8$$

When the operator gives, via the MMI, an instruction to update the statistical processing program 321, the updating unit 312 of the master CM switches the operation modes of the master CM and slave CM to a maintenance mode. The updating unit 312 of the master CM changes the statistical processing program 321 within the memory unit 311 to an update statistical processing program input via the MMI. This updates the statistical processing program 321 and the additional value table 811.

The updating unit 312 of the master CM transfers the updated statistical processing program 321 to the slave CM, and the updating unit 312 of the slave CM updates the statistical processing program 321 within the memory unit 311 to the received statistical processing program 321. This synchronizes the statistical processing program 321 and additional value table 811 of the slave CM with the statistical processing program 321 and additional value table 811 of the master CM.

Updating the statistical processing program 321 in the maintenance mode allows the additional value table 811 to be updated without stopping operations of the master CM and slave CM.

Figure 12:
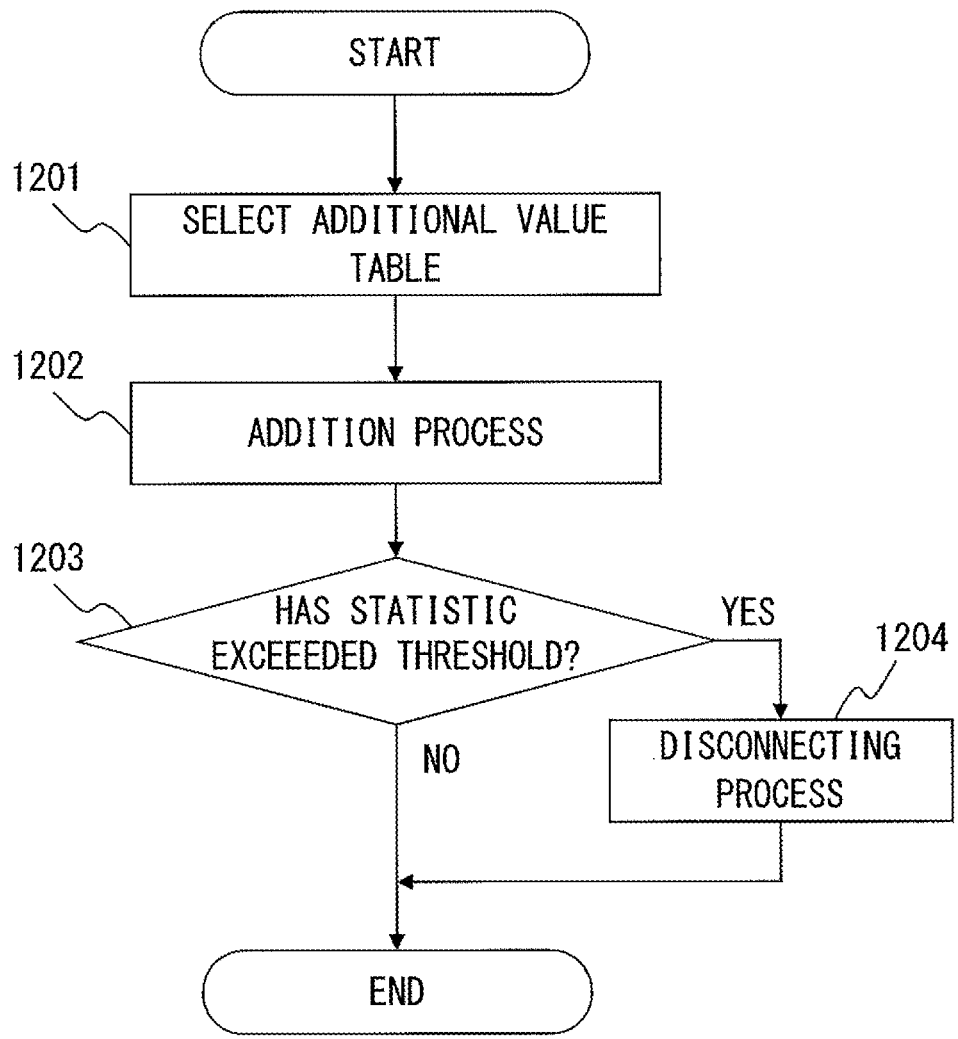
FIG. 12 is a flowchart of statistical processing.

FIG. 12 is a flowchart illustrating an example of statistical processing performed by the statistical processing units 313 of the master CM and slave CM when an error occurs in access to a disk. For example, the master CM and the slave CM may each monitor disks within a different range from among the disks 543, 553, 563, and 573 in FIG. 5. When an error occurs in access to a monitoring-target disk, the statistical processing units 313 of the master CM and slave CM update a corresponding statistic within the statistical information table 814.

The statistical processing unit 313 selects an additional value table to be used for statistical processing from the additional value table 811 and the additional value tables 812 (step S1201). The statistical processing unit 313 obtains an additional value corresponding to an error type from the selected additional value table, and adds this value to a statistic in the statistical information table 814 (step 1202).

The statistical processing unit 313 obtains a threshold from the selected additional value table and compares the statistic with the threshold (step 1203). When the statistic is equal to or lower than the threshold (NO in step 1203), the statistical processing unit 313 ends the process. On the other hand, when the statistic is higher than the threshold (YES in step 1203), the statistical processing unit 313 performs a process of logically disconnecting a corresponding monitoring-target disk or route component (step 1204).

Figure 13:
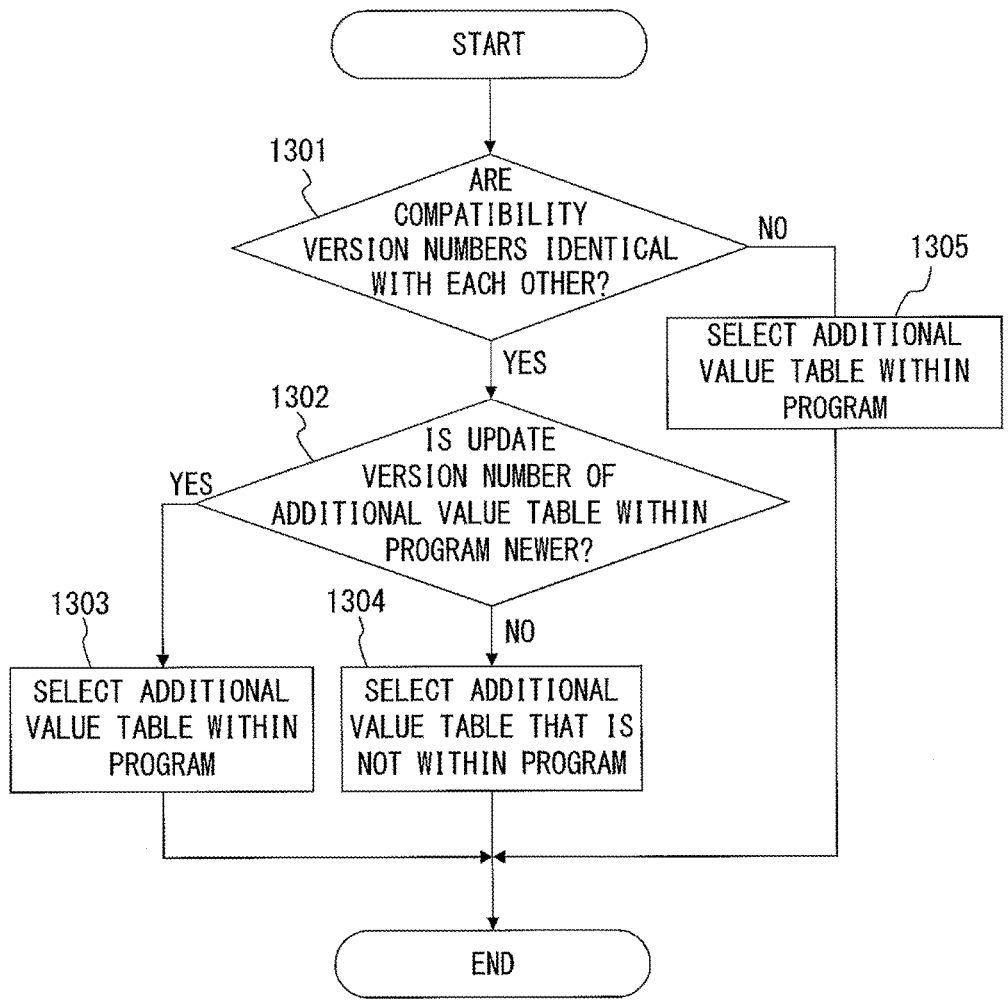
FIG. 13 is a flowchart of an additional-value-table selecting process.

FIG. 13 is a flowchart illustrating an exemplary additional-value-table selecting process performed in step 1201 in FIG. 12. The statistical processing unit 313 compares a compatibility version number indicated by version number information of the additional value table 811 in the statistical processing program 321 with a compatibility version number indicated by version number information of a valid additional value table 812 (step 1301).

When the compatibility version number indicated by the version number information of the additional value table 811 is identical with the compatibility version number indicated by the version number information of the additional value table 812 (YES in step 1301), the statistical processing unit 313 performs the process of step 1302. In step 1302, the statistical processing unit 313 compares an update version number indicated by the version number information of the additional value table 811 with an update version number indicated by the version number information of the additional value table 812.

When the update version number indicated by the version number information of the additional value table 811 is newer than the update version number indicated by the version number information of the additional value table 812

(YES in step 1302), the statistical processing unit 313 selects the additional value table 811 (step 1303).

On the other hand, when the update version number indicated by the version number information of the additional value table 811 is identical with, or is older than, the update version number indicated by the version number information of the additional value table 812 (NO in step 1302), the statistical processing unit 313 selects the additional value table 812 (step 1304).

When the compatibility version number indicated by the version number information of the additional value table 811 is different from the compatibility version number indicated by the version number information of the additional value table 812 (NO in step 1301), the statistical processing unit 313 selects the additional value table 811 (step 1305).

The configuration of the storage controlling apparatus 301 depicted in FIGS. 3 and 8 and the configuration of the storage apparatus 501 depicted in FIG. 5 are mere examples, and some elements may be omitted or changed in accordance with an application and/or condition of the storage controlling apparatus 301 or the storage apparatus 501.

In one possible example, for the storage apparatus 501 in FIG. 5, the CM 512 may be omitted in a case where the CM 511 controls all access to the disks. Other memory apparatuses, e.g., semiconductor memory apparatuses, may be used instead of the disks 543, 553, 563, and 573.

For the storage controlling apparatus 301 in FIG. 8, one of the additional value table 812-1 or 812-2 may be omitted in a case where the additional value tables 812 are updated after the operation of the storage controlling apparatus 301 is stopped.

The additional value tables in FIGS. 6 and 7 are mere examples, and additional values corresponding to error types different from those in FIGS. 6 and 7 may be used. Values different from those in FIGS. 6 and 7 may be used as additional values corresponding to the error types in FIGS. 6 and 7.

The flowcharts in FIGS. 10-13 are mere examples, and some processes may be omitted or changed in accordance with the configuration and/or condition of the storage controlling apparatus 301. In, for example, a case where only the CM 511 in FIG. 5 controls all access to the disks, only the CM 511 performs the processes depicted in FIGS. 10-13, and the synchronizing process in step 1003 in FIG. 10 may be omitted. In a case where the additional value tables 812 are updated after the operation of the storage controlling apparatus 301 is stopped, the updating unit 312 may directly update the additional value tables 812 instead of switching between the two additional value tables 812.

When an update additional value table is known to have compatibility, the compatibility check in step 1001 in FIG. 10 may be omitted. When a statistic before update can also be used as a statistic after update, the process of step 1006 in FIG. 10 may be omitted.

In step 1202 in FIG. 12, the statistical processing unit 313 may update a statistic by performing, instead of the addition process, another type of statistical processing such as multiplication, subtraction, or average value calculation. In step 1204 in FIG. 12, instead of the process of disconnecting a disk or route component, the statistical processing unit 313 may perform another type of troubleshooting.

When the additional value tables 811 and 812 are known to be compatible with each other, the processes of steps 1301 and 1305 in FIG. 13 may be omitted. When update version numbers of the additional value tables 811 and 812 are identical with each other in step 1302 in FIG. 13, the statistical processing unit 313 may select the additional value table 811 instead of the additional value table 812.

The storage controlling apparatuses 301 depicted in FIGS. 3 and 8 may be achieved using, for example, an information processing apparatus (computer) depicted in FIG. 14.

The information processing apparatus depicted in FIG. 14 includes a CPU 1401, a memory 1402, an input device 1403, an output device 1404, an auxiliary storage device 1405, a medium driving device 1406, a network connection device 1407, an IOC 1408, and an EXP 1409. The CPU 1401, the memory 1402, the input device 1403, the output device 1404, the auxiliary storage device 1405, the medium driving device 1406, the network connection device 1407, and the IOC 1408 are connected to each other by a bus 1410.

The memory 1402 is, for example, a semiconductor memory such as a Read Only Memory (ROM), Random Access Memory (RAM), or flash memory, and stores a program and data for use in processing. The memory 1402 may be used as the memory unit 311 depicted in FIGS. 3 and 8.

In one possible example, the CPU 1401 (processor) executes a program using the memory 1402 so as to operate as the updating unit 312, the statistical processing unit 313, and the disk driver 801 depicted in FIG. 3 or 8.

The input device 1403 is, for example, a keyboard or pointing device, and is used to input information and/or instruction from an operator or user. The output device 1404 is, for example, a display device, printer, or speaker, and is used to output a processing result and a query or an instruction to the operator or user.

The auxiliary storage device 1405 is, for example, a magnetic disk device, optical disk device, a magneto-optical disk device, or a tape device. The auxiliary storage device 1405 may be a hard disk drive or flash memory. An information processing apparatus may store a program and data in the auxiliary storage device 1405 and may use the program and data by loading them into the memory 1402.

The medium driving device 1406 drives a portable recording medium 1411 and accesses data recorded therein. The portable recording medium 1411 is, for example, a memory device, flexible disk, optical disk, or magneto-optical disk. The portable recording medium 1411 may be, for example, a Compact Disk Read Only Memory (CD-ROM), Digital Versatile Disk (DVD), or Universal Serial Bus (USB) memory. An operator or user may store a program and data in the portable recording medium 1411 and may use the program and data by loading them into the memory 1402.

As described above, the computer-readable recording medium for storing a program and data for use in processing is a physical (non-transitory) recording medium such as the memory 1402, the auxiliary storage device 1405, or the portable recording medium 1411.

The network connection device 1407 is a communication interface that is connected to a communication network such as a Local Area Network or Wide Area network and that performs data conversion associated with a communication. An information processing apparatus may receive a program and data from an external apparatus via the network connection device 1407 and may use the program and data by loading them into the memory 1402. The information processing apparatus and an operator terminal may be connected to each other by the network connection device 1407.

The IOC 1408 corresponds to the IOC 523, 524, 533, or 534 in FIG. 5. The EXP 1409 corresponds to the EXP 522 or 532.

The information processing apparatus do not need to include all of the elements in FIG. 14, and some of the elements may be omitted in accordance with an application or condition. In, for example, a case where an instruction or information from an operator or user is input via the network connection device 1407, the input device 1403 may be omitted. In a case where a query or instruction to an operator or user and a processing result are output via the network connection device 1407, the output device 1404 may be omitted. In a case where the portable recording medium 1411 or a communication network is not used, the medium driving device 1406 or the network connection device 1407 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage controlling apparatus comprising:
    a memory that stores a statistical processing program for controlling a storage apparatus, first definition information to be updated together with the statistical processing program, and second definition information, the statistical processing program being used for obtaining a statistic used for determining whether to perform controlling the storage apparatus for a troubleshooting, the first definition information and the second definition information each including an additional value to be added to the statistic when an error occurs; and
    a processor that
        updates both the statistical processing program and the first definition information when updating the statistical processing program,
        updates the second definition information without updating the statistical processing program when updating the second definition information,
        performs, so as to obtain the statistic, statistical processing for controlling the storage apparatus by using the additional value included in the updated first definition information or the updated second definition information, and
        controls the storage apparatus to disconnect logically a constituent element of the storage apparatus for the troubleshooting according to the statistic obtained by performing the statistical processing.

2. The storage controlling apparatus according to claim 1, wherein
    the memory stores first version number information indicating a version number of the first definition information and second version number information indicating a version number of the second definition information, and
    the processor updates the first version number information together with the first definition information, updates the second version number information together with the second definition information, uses the updated first definition information when the version number indicated by the updated first version number information is newer than the version number indicated by the second version number information, and uses the updated second definition information when the version number indicated by the updated second version number information is newer than the version number indicated by the first version number information.

3. The storage controlling apparatus according to claim 2, wherein
    the processor uses the updated first definition information when the version number indicated by the updated first version number information is incompatible with the version number indicated by the second version number information, and uses the first definition information when the version number indicated by the updated second version number information is incompatible with the version number indicated by the first version number information.

4. The storage controlling apparatus according to claim 1, wherein
    each of the first definition information and the second definition information further includes a threshold for the statistic, and
    the processor changes the statistic before update according to a ratio between the threshold included in the updated first definition information or the updated second definition information and the threshold included in the first definition information before update or the second definition information before update, and performs the statistical processing by using the changed statistic.

5. A non-transitory computer-readable recording medium having stored therein a program causing a computer to execute a process comprising:
    referring to a memory that stores a statistical processing program for controlling a storage apparatus, first definition information to be updated together with the statistical processing program, and second definition information, the statistical processing program being used for obtaining a statistic used for determining whether to perform controlling the storage apparatus for a troubleshooting, the first definition information and the second definition information each including an additional value to be added to the statistic when an error occurs;
    updating both the statistical processing program and the first definition information when updating the statistical processing program;
    updating the second definition information without updating the statistical processing program when updating the second definition information;
    performing, so as to obtain the statistic, statistical processing for controlling the storage apparatus by using the additional value included in the updated first definition information or the updated second definition information; and
    controlling the storage apparatus to disconnect logically a constituent element of the storage apparatus for the troubleshooting according to the statistic obtained by performing the statistical processing.

6. The recording medium according to claim 5, wherein
    the memory stores first version number information indicating a version number of the first definition information and second version number information indicating a version number of the second definition information,
    the updating the definition information updates the first version number information together with the first definition information, and updates the second version number information together with the second definition information, and the performing the statistical processing uses the updated first definition information when the version number indicated by the updated first version number information is newer than the version number indicated by the second version number information, and uses the updated second definition information when the version number indicated by the updated second version number information is newer than the version number indicated by the first version number information.

7. The recording medium according to claim 6, wherein the performing the statistical processing uses the updated first definition information when the version number indicated by the updated first version number information is incompatible with the version number indicated by the second version number information, and uses the first definition information when the version number indicated by the updated second version number information is incompatible with the version number indicated by the first version number information.

8. The recording medium according to claim 5, wherein each of the first definition information and the second definition information further includes a threshold for the statistic,
the updating the definition information changes the statistic before update according to a ratio between the threshold included in the updated first definition information or the updated second definition information and the threshold included in the first definition information before update or the second definition information before update, and
the performing the statistic processing uses the changed statistic.

9. A controlling method comprising:
referring to, by a processor, a memory that stores a statistical processing program for controlling a storage apparatus, first definition information to be updated together with the statistical processing program, and second definition information, the statistical processing program being used for obtaining a statistic used for determining whether to perform controlling the storage apparatus for a troubleshooting, the first definition information and the second definition information each including an additional value to be added to the statistic when an error occurs;
updating, by the processor, both the statistical processing program and the first definition information when updating the statistical processing program;
updating, by the processor, the second definition information without updating the statistical processing program when updating the second definition information;
performing, by the processor so as to obtain the statistic, statistical processing for controlling the storage apparatus by using the additional value included in the updated first definition information or the updated second definition information; and
controlling, by the processor, the storage apparatus to disconnect logically a constituent element of the storage apparatus for the troubleshooting according to the statistic obtained by performing the statistical processing.

10. The controlling method according to claim 9, wherein the memory stores first version number information indicating a version number of the first definition information and second version number information indicating a version number of the second definition information,
the updating the definition information updates the first version number information together with the first definition information, and updates the second version number information together with the second definition information, and
the performing the statistical processing uses the updated first definition information when the version number indicated by the updated first version number information is newer than the version number indicated by the second version number information, and uses the updated second definition information when the version number indicated by the updated second version number information is newer than the version number indicated by the first version number information.

11. The controlling method according to claim 10, wherein
the performing the statistical processing uses the updated first definition information when the version number indicated by the updated first version number information is incompatible with the version number indicated by the second version number information, and uses the first definition information when the version number indicated by the updated second version number information is incompatible with the version number indicated by the first version number information.

12. The controlling method according to claim 9, wherein each of the first definition information and the second definition information further includes a threshold for the statistic,
the updating the definition information changes the statistic before update according to a ratio between the threshold included in the updated first definition information or the updated second definition information and the threshold included in the first definition information before update or the second definition information before update, and
the performing the statistic processing uses the changed statistic.

* * * * *